United States Patent [19]

Banta

[11] 3,882,069
[45] May 6, 1975

[54] STABILIZED DISPERSIONS OF CHLOROPRENE POLYMERS

[75] Inventor: Edward M. Banta, Baytown, Tex.

[73] Assignee: Petro-Tex Chemical Corporation, Houston, Tex.

[22] Filed: Aug. 21, 1972

[21] Appl. No.: 282,429

[52] U.S. Cl. .............. 260/29.7 SQ; 260/29.6 MQ; 260/29.7 N; 260/29.7 E; 260/DIG. 14; 260/457
[51] Int. Cl. ... C08d 7/10; C08d 7/18; C07c 141/00
[58] Field of Search... 260/29.7 E, 29.7 H, DIG. 14, 260/457, 29.7 SQ, 29.7 N, 29.6 MQ

[56] References Cited
UNITED STATES PATENTS

| | | | |
|---|---|---|---|
| 3,150,161 | 9/1964 | Nunn | 260/457 |
| 3,337,601 | 8/1967 | Whitman | 260/457 |

OTHER PUBLICATIONS

McCutcheon, "Detergents and Emulsifiers" 1971 Annual, p. 193.

J. C. Carl, Neoprene Latex (DuPont 1962) pp. 10, 11 (TS1925 C25).

Schönfeldt, Surface Active Ethylene Oxide Adducts, (Pergamon Press 1969) pp. 633-638 (TP994 S3).

Primary Examiner—Allan Lieberman
Assistant Examiner—T. DeBenedictis, Sr.
Attorney, Agent, or Firm—N. Elton Dry; Kenneth H. Johnson

[57] ABSTRACT

Aqueous dispersions of chloro-2-butadiene-1,3 having improved stability against premature coagulation during compounding of the latex dispersions are obtained by incorporating sodium or ammonium salts of sulfated nonyl phenoxy poly (ethyleneoxy) ethanol or an ammonium salt of a linear ethoxylate sulfates with the latex.

7 Claims, No Drawings

STABILIZED DISPERSIONS OF CHLOROPRENE POLYMERS

BACKGROUND OF THE INVENTION

Polymers of chloro-2-butadiene-1,3 also known as neoprene or polychloroprene are conventionally formed by polymerization in emulsion polymerization utilizing a combination of emulsifying agents. Conventionally, emulsifying agents are such as rosin acid salts and various secondary emulsifiers such as salt of the condensation product of naphthalene sulfonic acids and formaldehyde. The emulsifiers are employed to increase the stability of the latices during the polymerization process. In certain cases, however, the utilization of these latices is interfered with by a tendency for the polychloroprene polymer to separate from the latex during storage, mechanical agitation, or especially during addition of compounding ingredients and during handling and storage of the compounded latex.

To preserve the stability of neoprene latices, it has been suggested to add caustic to the latex when the latex reaches such a state that compounding causes instability. However, the addition of caustic has two effects: (1) it increases pH of the latex thus tending to improve the stability of the latex and (2) it raises the concentration of ions present in the latex thus tending to reduce the stability of the latex. As a result of the second effect mentioned above, excessive addition of caustic can itself cause instability, and thus, other stabilization agents have been sought.

In U.S. Pat. No. 2,264,191, issued on Nov. 25, 1941, the use of certain alcohols and ketones are disclosed as stabilizing agents. In U.S. Pat. Nos. 2,138,226 and 2,263,322 issued on Nov. 29, 1938 and Nov. 18, 1941 respectively, the use of betaines as stabilizers for the neoprene latex is described. Several other stabilizers have been disclosed in the book "Neoprene Latex," J. C. Carl, published E. I. DuPont de Nemours and Company, 1962. These stabilizers include sodium alkyl sulfates, poly oxyethylated fatty alcohols and octyl phenoxy polyethoxy ethanols. In certain applications it is desirable that the end product produced from the neoprene latex be insensitive to water, i.e., is not affected by the presence of water and resistant to absorbtion of water. For instance, shoe board used as the insole of shoes is impregnated with a neoprene latex followed by a curing of the impregnated latex. It is most desirable that the resulting cured neoprene in the shoe board be insensitive to water, especially resistant to the absorbtion of water. The above mentioned stabilizers are moderately effective in stabilizing neoprene latex from coagulation during storage, mechanical agitation or addition of compounding ingredients, however, a stabilizing agent which will provide superior stabilization is certainly desirable. In addition, the above mentioned stabilizers all render the cured neoprene susceptible to water sensitivity in that the cured neoprene containing the stabilizers demonstrates a far greater tendency to absorb water than neoprene which does not contain the above mentioned stabilizers. A stabilizer which has found moderate commercial usage for stabilizing neoprene latexes without rendering the neoprene susceptible to water absorbtion is nonyl phenyl polyethylene glycol ether (sold under the trade name Tergitol NP-44). Tergitol NP-44 does not effect the cured neoprene's water resistant properties, however, the stabilizer produces only a minimum stabilizing effect to the neoprene latex.

It is an object of the present invention to provide a stabilizer for neoprene latexes which provides superior stability to the neoprene latex. Another object of the present invention is to provide a neoprene latex having an improved stability from separation and coagulation of the latex during storage, mechanical agitation or addition of compounding ingredients. A still further object of the present invention is to provide an improved neoprene latex having superior stability to separation and coagulation of the latex during storage, mechanical agitation, or addition of compounding ingredients and which when cured to the solid neoprene material results in a material having good resistance to absorption of water.

SUMMARY OF THE INVENTION

Aqueous dispersion of polymers of chloro-2-butadiene-1,3 having superior stability, i.e., resistance of the suspended polymer from separating or coagulating from the dispersion during storage, mechanical agitation or the addition of compounding ingredients, is provided by incorporating ammonium salts of alkyl ethoxylate sulfates or ammonium salts of sulfated alkyl phenoxy poly (ethyleneoxy) ethanol into the aqueous polymer dispersion. The additives of this invention can be added to the aqueous chloroprene monomer prior to polymerization or during polymerization as well as to the polychloroprene latex resulting from the emulsion polymerization of the chloroprene monomer.

DESCRIPTION OF THE PREFERRED EMBODIMENTS

The aqueous latex emulsion of chloroprene polymer employed in the present invention may be made by many processes known to those skilled in the art, e.g., processes disclosed in U.S. Pat. Nos. 2,187,146; 2,227,517; and 2,259,122. This invention is applicable to all types of chloroprene polymers made by polymerization, for example, in the presence of mercaptans or other modifying (chain transfer) agents such as the dialkyl xanthogen disulfides, or in the presence of sulfur, followed by plasticizing treatment, or by very limited polymerization without agents followed by removal of unchanged monomer. All these processes are fully described in the prior art. See for example U.S. Pat. Nos. 1,950,436, 2,234,215, 2,567,117 in addition to the above mentioned U.S. Patents.

The polymers of chloroprene used include both polychloroprene itself and copolymers of chloroprene with up to an equal weight of ethylenically unsaturated monomers copolymerizable therewith, such as styrene, acrylic nitrile, methyl methacrylate, isoprene, butadiene, and 2,3-dichlorobutadiene-1,3. The properties conferred by the co-monomers and the methods for using them are well known in the prior art. Likewise, materials used with the chloroprene polymers as antioxidants, plasticizers, curing agents, accelerators, reinforcing agents, pigments and extenders are well known, as are the quantities which should be used under various circumstances. This prior art is applicable in the present invention. The polymerization is carried out in an aqueous emulsion using any of the conventional emulsifying agents suitable for chloroprene polymerizations. These include water-soluble salts of compounds of the following types: long-chain fatty acids, rosins and modified rosins, partially polymerized rosins, fatty alcohols sulfates, arylsulfonic acids, such as nonylbenzene sulfonic acid for the formaldehyde condensation product of naphthalene sulfonic acid.

When sulfur is used in the polymerization, it will ordinarily be used in an amount between 0.25 and about 2.0 percent of the monomer used. Any of the conventional free-radical polymerization catalysts may be used. These include alkali metal or ammonium ferricyanides, alkali metal or ammonium per sulfates, and inorganic or organic peroxides such as hydrogen peroxide, cumene hydroperoxide, and dibenzoyl peroxide. The polymerization may be carried out between 0° C and 80° C, preferably between 40° and 50° C. Below 0° C the polymerization is inconveniently slow and above 80° C the reaction is hard to control.

The concentration of monomeric material present in the aqueous emulsion is not critical. In general, 30 to 60 percent, by weight, based on the total weight of the emulsion, is the range of concentrations of monomer used in the preparation of the latex. The polymerization may be stopped at any desired point by the addition of conventional "short stopping" agents such as phenyl phenothiazine and tert-butyl-catechol, as disclosed in U.S. Pat. No. 2,576,009 or the polymerization can be taken to completion. The unreacted monomers may be stripped from the polymer latex by known methods such as by turbannular steam stripping as described in U.S. Pat. No. 2,467,769. The polymer may be isolated by conventional means, such as by a freezing technique as disclosed in U.S. Pat. No. 2,187,146 or by drum drying as disclosed in U.S. Pat. No. 2,914,497.

It has now been found that neoprene latex suspensions having far superior stability against premature flocculation or coagulation during storage, mechanical agitation or addition of compounding ingredients to the latex can be obtained by incorporating a particular group of stabilizing agents in the neoprene latex. The stabilizing agents which have been found to be effective are ammonium salts of ethoxylate sulfates and the sodium and ammonium salts of sulfated alkyl phenoxy poly(ethylene-oxy) ethanol having the following general formulas respectively, $R(OCH_2CH_2)_nOSO_3NH_4$, $R C_6H_4(OCH_2CH_2)_nOSO_3Na$ and $RC_6H_4(OCH_2CH_2)_nOSO_3NH_4$ wherein R is an alkyl group of from 5 to 20 carbon atoms, and $n$ is an integer from 2 to 20. The alkyl group R is preferably a linear alkyl having from 7 to 15 carbon atoms. Particularly preferred alkyl groups are linear alkyls of from 8 to 12 carbon atoms. In a preferred embodiment of the present invention, $n$ is selected from between 3 and 12.

It is within the scope of this invention to add the above stabilizing agents to the chloroprene system before, during or after polymerization. The amount of stabilizer to be added is within the range of 0.25 to 10 parts per 100 parts of polychloroprene solids in the latex. Preferably, the stabilizer will be present in a range 0.25 to 1.0 parts per 100 parts polychloroprene solids.

The following examples are presented to further demonstrate the operation of the present invention. It should be understood, however, that these examples are intended to be illustrative only, and not intended to limit the scope of the invention. The term "parts" whenever hereinafter used signifies "parts by weight" unless otherwise indicated.

PREPARATION OF NEOPRENE LATEX

A mixture of 100 parts chloroprene, 4 parts wood rosin, 0.1 parts iodoform ($CHI_3$), 0.1 parts 2,6-ditertiary butyl paracresol and 0.01 parts sulfur were emulsified by mechanical agitation in 100 parts of water containing 1.25 parts of sodium hydroxide and 0.3 parts of the sodium salt of the condensation product of naphthalene sulfonic acid and formaldehyde (Lomar PW produced by Nopco). The emulsion was heated and maintained at a temperature of 45° C and a catalyst solution containing potassium persulfate was added in an amount sufficient to maintain polymerization in the chloroprene mixture. The catalyst solution comprised an aqueous solution of potassium persulfate in a concentration of approximately 4.5 percent by weight. The potassium persulfate solution was added to the chloroprene mixture until polymerization was substantially complete. A solution of one part diethanolamine in 2.33 parts water was then added to the polymer emulsion. The resulting neoprene latex contained from 49 to 51 percent solids by weight.

EXAMPLES 1 – 11

In each of the examples, a portion of neoprene latex prepared by the procedure outlined hereinbefore was compounded and subjected to chemical destabilization with sodium aluminate. The chemical stability of each latex is determined by the amount of coagulation produced by the compounding and destabilization with sodium aluminate. In all the examples, each portion of neoprene latex was treated with a compounding material comprising zinc oxide, tetraethyl thiuram disulfide and ammonium caseinate in a reatio of 5 parts zinc oxide to 1 part tetraethyl thiuram disulfide to 1.25 parts of 15 percent aqueous solution of ammonium caseinate. The compound material was incorporated into the latex portions at a level of 5 parts per 100 parts of polychloroprene solids in the latex. Immediately after compounding the portions of latex were each treated with a 25 percent aqueous solution of sodium aluminate. The sodium aluminate solution was added dropwise to the portions of latex while the latex was being stirred gently. The amount of sodium aluminate added was 1.12 parts per 100 parts of chloroprene solids in the latex. After the sodium aluminate addition, each portion of latex was vigorously agitated for 10 minutes. Following the agitation, each latex sample was poured through a 100 mesh stainless steel screen funnel and the coagulated solids were collected from the screen, washed with distilled water to remove any remaining latex and then dried. The percent coagulated solids is determined by multiplying the weight of coagulated solids collected by 100 and dividing this product by the weight of polychloroprene solids of the latex sample.

The latex portion used in example 1 was taken directly from the latex produced by the procedure given hereinbefore. There was no further stabilizing agent added to the latex of example 1 prior to the compounding and chemical destabilization with sodium aluminate. The neoprene samples used in examples 2–11 were prepared by the procedure outlined hereinbefore and just prior to the compounding and destabilization steps, various stabilizers were added to the neoprene latex as shown in Table I. The amount of stabilizer added to each sample of neoprene latex is also shown in Table I.

TABLE I

| Ex. | Stabilizer added to neoprene latex sample prior to compounding | Amount of stabilizer added (parts per 100 pts. neoprene solids in latex) | % Coagulation |
|---|---|---|---|
| 1 | None | 0 | 11.2 |
| 2 | Tergitol NP-44[1] | 0.33 | 9.1 |
| 3 | Igepal CO-430[2] | 0.5 | |
| 4 | Emulrin W[3] | | |
| 5 | Alipal CD-128[4] | 0.25 | 5.55 |
| 6 | Alipal CD-128 | 0.50 | 1.54 |
| 7 | Alipal CD-128 | 0.75 | 0.46 |
| 8 | Alipal CD-128 | 1.00 | 0.34 |
| 9 | Alipal CD-128 | 1.5 | 0.18 |
| 10 | Alipal CO-128 | 2.00 | 0.11 |
| 11 | Alipal CD-128 | 2.50 | 0.13 |

[1]Nonylphenyl polyethylene glycol ether produced by Union Carbide Corp.
[2]Nonylphenoxypoly (ethyleneoxy) ethanol produced by GAF Corp.
[3]Aromatic polyglycol ether produced by Farbenfabriken Bayer A G.
[4]Ammonium salt of a sulfated linear primary alcohol ethoxylate produced by GAF Corp.

A comparison of examples 5–11 with examples 1–4 shows clearly the unexpected and dramatic improvement in stability obtained by using a stabilizer according to the present invention.

EXAMPLES 12 – 17

Each of the samples of neoprene latex used in examples 12–17 were tested to determine their stability against coagulation due to mechanical work such as mixing and pumping. The procedure used in each of the examples 12–17 in determining the stability of the neoprene was as follows: A sample of neoprene latex prepared according to the procedure given hereinbefore was treated with a compounding agent comprising zinc oxide, tetraethyl thiuram disulfide and ammonium caseinate as in examples 1 – 11. Immediately after compounding the samples of latex were placed in a beaker agitated with a high speed blender for 20 minutes at a speed of 18,000 RPM. At the end of the mixing period, the contents of the beakers were carefully poured through a 100 mesh stainless steel screen and the coagulated material was recovered from the screen. The coagulated residue was washed with distilled water to remove any neoprene latex therefrom. The washed coagulum was subsequently dried. The percent of coagulated material was determined by multiplying the weight of dried coagulated residue obtained by 100 and dividing the product by the weight of dry neoprene solids contained in the initial latex sample.

Example 12 is a control example, i.e., there was no stabilizing additive added to the neoprene latex prior to the mixing procedure. In Examples 13 – 17, various stabilizer materials were added to the neoprene latex samples prior to the mixing procedure. The specific stabilizer material and the amount of the stabilizer material added to the latex are given in Table II. Also given in Table II are the results, i.e., the percent of coagulated material obtained in each example.

TABLE II

| Ex. | Stabilizer added to neoprene sample prior to mechanical mixing | Amount of stabilizer added (parts per 100 pts. neoprene solids in latex) | % Coagulation |
|---|---|---|---|
| 12 | None | | 1.2 |
| 13 | Tergitol NP-44 | 0.5 | 0.68 |
| 14 | Igepal CO-430 | 0.5 | 12.8 |
| 15 | Ethylene diamine tetraacidic acid | 0.5 | 2.5 |

TABLE II-Continued

| Ex. | Stabilizer added to neoprene sample prior to mechanical mixing | Amount of stabilizer added (parts per 100 pts. neoprene solids in latex) | % Coagulation |
|---|---|---|---|
| 16 | Alipal EP-120* | 0.5 | 0.23 |
| 17 | Alipal CD-128 | 0.5 | 0.02 |

*Ammonium salt of a sulfate ester of an alkylphenoxy-poly (ethyleneoxy) ethanol produced by GAF Corp.

Again a comparison of examples 16 and 17 with examples 12 – 15 shows clearly the unexpected and dramatic improvement in stability obtained by using the stabilizer according to the present invention.

EXAMPLE 18

In a series of polymerization of chloroprene to neoprene latex as described hereinbefore, the stabilizer Alipal CD-128 was added to the chloroprene monomer prior to polymerization and was, thus, present during the polymerization of the chloroprene to neoprene latex. In stability tests similar to those above used in examples 1 – 17, the neoprene latex containing the Alipal CD-128 which had been added to the chloroprene monomer prior to polymerization to the neoprene latex demonstrated equivalent stability to the latexes of examples 5 – 11 and 16 and 17.

Neoprene latex processed as in example 6 was used to impregnate shoe board material. The impregnated shoe board material exhibited excellent resistance to the effect of water, i.e., absorbtion of water. This property is most beneficial in that surfactant type stabilizers generally render the neoprene most susceptible to the absorbtion of water.

EXAMPLES 19 – 21

In each of the examples, a portion of neoprene latex prepared by the procedure outlined hereinbefore was subjected to chemical destabilization with sodium aluminate. The procedure followed in examples 19 – 21 was similar to that given for examples 1 – 11 with the sole exception that the compounding ingredients of examples 1 – 11 were not added to the neoprene latex prior to the chemical destabilization with a sodium aluminate in exammples 19 – 21.

In example 19, there was no further stabilizing agent added to the neoprene latch prior to the chemical destabilization with sodium aluminate. The neoprene latex samples used in examples 20 – 21 had stabilizers added thereto just prior to the chemical destabilization step. The stabilizer and amount added to each sample of neoprene latex is shown in Table III. Also shown in Table III is the percent coagulated solids produced by the chemical destabilization which were determined by multipyling the weight of coagulated solids collected by 100 and dividing this product by the weight of polychloroprene solids in the latex sample.

TABLE III

| Ex. | Stabilizer added to neoprene latex sample prior to chemical destabilization | Amount of stabilizer added (parts per 100 pts. neoprene solids in latex) | % Coagulation |
|---|---|---|---|
| 19 | None | 0 | 2.77 |
| 20 | Alipal CD-128 | 0.5 | 0.09 |
| 21 | Alipal EO-526* | 0.5 | 0.03 |

*Sodium salts of sulfated nonylphenoxypoly (ethyleneoxy) ethanol produced GAF Corp.

EXAMPLES 22 – 24

The procedure of examples 20 and 21 were repeated with the exception that the stabilizer added to the neoprene latex in example 22 and the formula $R(OCH_2CH_2)_nOSO_3NH$ wherein R was a linear alkyl of carbon atoms and n ranged between 3 and 4. In example 23, the stabilizer added to the neoprene latex was nonylphenoxypoly (ethyleneoxy) ethanol having the formula $RC_6H_4(OCH_2CH_2)_nOSO_3Na$ wherein R is a linear nonyl group and n is 12. In example 24, the stabilizer added to the neoprene latex was an ammonium salt of nonylphenoxypoly (ethyleneoxy) ethanol having the formula $RC_6H_4(OCH_2CH_2)_nOS_3NH$ wherein R in a linear nonyl group and $n$ is 12. The results obtained in examples 22 – 24 were similar to the result for examples 20 and 21 reported hereinbefore.

EXAMPLE 25

The addition of surface active agents to neoprene latex generally increases the tendency of the latex to produce undesirable foam. The stabilizers according to the present invention were quite unexpectedly found to produce less foam in the neoprene latex than other surface active agents added to the neoprene latex in the same concentration. In one set of runs, Alipal CD-128 and Tergitol NP-44 were added to separate portions of neoprene latex which had been produced by the procedure given hereinbefore. Both portions of neoprene latex were then agitated by discharging a gas stream into the latex. After 4 minutes of vigorous agitation, the neoprene latex containing the Alipal CD-128 had produced a foam of 17 inches in depth whereas the neoprene latex containing the Tergitol NP-44 had produced a form of 24 inches in depth. The agitation was discontinued after 4 minutes and the samples of neoprene latex were allowed to stand. The latex containing Alipal CD-128 required only 1 minute after termination of the gas agitation for the foam produced during the agitation to break down and disappear. It took 2 minutes for the latex containing Tergitol NP-44 to reach a point of essentially no foam.

It has further been found that the stabilizer agents of the present invention act as effective stabilizers during creaming of the latex and further effectively stabilize the higher solids content latex produced by the creaming procedure. In a set of runs, neoprene latex was creamed by a conventional technique to produce latex having approximately 60 percent solids from a latex having 50 percent solids. In those runs wherein the latex contained the stabilizer of the present invention, the amount of coagulation produced during creaming was essentially nil. Coagulation during mechanical and chemical destabilization of the latex of 60 percent solids was similar to the results obtained in the above samples using the same stabilizer. In comparison, neoprene latex containing Tergitol NP-44 was found to produce considerable coagulation products during creaming. Further, coagulation resulting from chemical and mechanical destabilization tests was also greater than for latexes wherein the creaming step was omitted.

What is claimed is:

1. A stable aqueous dispersion of a polymer of chloro-2-butadiene-1,3 comprising said polymer and a stabilizing agent selected from the group consisting of ammonium salts of alkyl ethoxylate sulfates and sodium and ammonium salts of sulfated alkyl phenoxy poly (ethyleneoxy) ethanol.

2. A stable aqueous dispersion of a polymer of chloro-2-butadiene-1,3 as claimed in claim 1 wherein the ammonium salts of alkyl ethoxylate sulfates has the general formula $R(OCH_2CH_2)_nOSO_3NH_4$ and the sodium and ammonium salts of sulfated alkyl phenoxy poly (ethyleneoxy) ethanol have the general formula $RC_6H_4(OCH_2CH_2)_nOSO_3Na$ and $RC_6H_4(OCH_2CH_2)_nOSO_3$-$NH_4$ wherein R is an alkyl group of from 5 to 20 carbon atoms and $n$ is an integer from 2 to 20.

3. A stable aqueous dispersion of a polymer of chloro-2-butadiene-1,3 as claimed in claim 1 wherein the stabilizer is present within the range of 0.25 to 10 parts per 100 parts of chloro-2-butadiene-1,3 polymer in the latex.

4. A stable aqueous dispersion of a polymer of chloro-2-butadiene-1,3 as claimed in claim 3 wherein the range of stabilizer is 0.25 to 10 parts per 100 parts polymer.

5. A stable aqueous dispersion of a polymer of chloro-2-butadiene-1,3 as claimed in claim 3 wherein the stabilizer is $R(OCH_2CH_2)_nOSO_3NH_4$ and R is a linear alkyl of 12 carbon atoms and $n$ is 3 to 4.

6. A stable aqueous dispersion of a polymer of chloro-2-butadiene-1,3 as claimed in claim 3 wherein the stabilizer is selected from $RC_6H_4(OCH_2CH_2)_nOSO_3Na$ and $RC_6H_4(OCH_2CH_2)_nOSO_3NH_4$ R is linear nonyl and $n$ is 9 to 12.

7. A stable aqueous dispersion of a polymer of chloro-2-butadiene-1,3 as claimed in claim 1 wherein said polymer is a copolymer of said chloro-2-butadiene-1,3 with up to an equal weight of ethylenically unsaturated monomers copolymerized therewith, said ethylenically unsaturated monomers being selected from the group consisting of styrene, acrylic nitrile methyl methacrylate, isoprene, butadiene, and 2,3-dichlorobutadiene-1,3.

* * * * *